(12) United States Patent
Wehrmann et al.

(10) Patent No.: US 11,279,812 B2
(45) Date of Patent: Mar. 22, 2022

(54) GRAPHITE-CONTAINING POLYCARBONATE COMPOSITIONS CONTAINING A NEW TYPE OF FLOW PROMOTER

(71) Applicant: Covestro Deutschland AG, Leverkusen (DE)

(72) Inventors: Rolf Wehrmann, Krefeld (DE); Helmut Werner Heuer, Siegen (DE); Anke Boumans, Goch (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 322 days.

(21) Appl. No.: 16/479,778

(22) PCT Filed: Jan. 19, 2018

(86) PCT No.: PCT/EP2018/051346
§ 371 (c)(1),
(2) Date: Jul. 22, 2019

(87) PCT Pub. No.: WO2018/134371
PCT Pub. Date: Jul. 26, 2018

(65) Prior Publication Data
US 2021/0332216 A1    Oct. 28, 2021

(30) Foreign Application Priority Data

Jan. 23, 2017 (EP) .................................... 17152566

(51) Int. Cl.
| C08K 5/103 | (2006.01) |
| C08K 3/04 | (2006.01) |
| C08K 5/09 | (2006.01) |
| C08L 69/00 | (2006.01) |

(52) U.S. Cl.
CPC ............... *C08K 5/103* (2013.01); *C08K 3/04* (2013.01); *C08K 5/09* (2013.01); *C08L 69/00* (2013.01); *C08L 2205/025* (2013.01)

(58) Field of Classification Search
CPC .................................. C08L 69/00; C08K 3/04
See application file for complete search history.

(56) References Cited

U.S. PATENT DOCUMENTS

| 1,137,373 | A | 4/1915 | Aylsworth |
| 1,191,383 | A | 7/1916 | Aylsworth |
| 2,991,273 | A | 7/1961 | Hechelhammer et al. |
| 2,999,825 | A | 9/1961 | Floyd et al. |
| 2,999,846 | A | 9/1961 | Schnell et al. |
| 3,028,365 | A | 4/1962 | Schnell et al. |
| 3,148,172 | A | 9/1964 | Fox |
| 3,271,367 | A | 9/1966 | Schnell et al. |
| 3,404,061 | A | 10/1968 | Shane et al. |
| 3,879,348 | A | 4/1975 | Serini et al. |
| 4,982,014 | A | 1/1991 | Freitag et al. |
| 5,097,002 | A | 3/1992 | Sakashita et al. |
| 5,288,778 | A | 2/1994 | Schmitter et al. |
| 5,340,905 | A | 8/1994 | Kuhling et al. |
| 5,717,057 | A | 2/1998 | Sakashita et al. |
| 5,821,380 | A | 10/1998 | Holderbaum et al. |
| 5,883,165 | A | 3/1999 | Kröhnke et al. |
| 6,596,840 | B1 | 7/2003 | Kratschmer et al. |
| 6,740,730 | B1 | 5/2004 | Kratschmer et al. |
| 7,071,284 | B2 | 7/2006 | Kauth et al. |
| 9,617,457 | B2 | 4/2017 | Samisch et al. |
| 10,119,009 | B2 | 11/2018 | Wehrmann et al. |
| 10,472,516 | B2 * | 11/2019 | Heuer ..................... C08K 3/04 |
| 2009/0061220 | A1 * | 3/2009 | Nodera ............... C08L 2666/02 428/339 |
| 2015/0232669 | A1 * | 8/2015 | Daute ....................... C09C 3/10 523/210 |
| 2017/0002247 | A1 * | 1/2017 | Samisch .................. C08K 3/04 |
| 2017/0362430 | A1 | 12/2017 | Heuer et al. |
| 2018/0201780 | A1 | 7/2018 | Heuer et al. |

FOREIGN PATENT DOCUMENTS

| DE | 1570703 A1 | 2/1970 |
| DE | 2036052 A1 | 1/1972 |
| DE | 2063050 A1 | 7/1972 |
| DE | 2211956 A1 | 10/1973 |
| DE | 3832396 A1 | 2/1990 |
| EP | 0500496 A1 | 8/1992 |
| EP | 0839623 A1 | 5/1998 |
| EP | 1318175 A1 | 6/2003 |
| EP | 2840117 A1 | 2/2015 |
| EP | 3115408 A1 * | 1/2017 ............. C08K 5/103 |
| FR | 1561518 A | 3/1969 |
| GB | 1122003 A | 7/1968 |
| GB | 1229482 A | 4/1971 |
| GB | 1367790 A | 9/1974 |
| JP | S6162039 A | 3/1986 |
| JP | S6162040 A | 3/1986 |
| JP | S61105550 A | 5/1986 |
| JP | 201178889 A | 4/2011 |
| JP | 2014218535 A * | 11/2014 |
| WO | WO-9615102 A2 | 5/1996 |
| WO | WO-0105866 A1 | 1/2001 |
| WO | WO-0105867 A1 | 1/2001 |
| WO | WO-2004063249 A1 | 7/2004 |
| WO | WO-2015135958 A1 | 9/2015 |
| WO | WO-2016087295 A1 | 6/2016 |
| WO | WO-2016087296 A1 | 6/2016 |
| WO | WO-2017005735 A1 | 1/2017 |

OTHER PUBLICATIONS

Palsgaard (PGE 8100, Palsgaard, 2014, 10 page).*
Machine translation of JP 2014218535 (2014, 11 pages).*
International Search Report for PCT/EP2018/051346 dated Feb. 28, 2018.
Written Opinion of the International Searching Authority for PCT/EP2018/051346 dated Feb. 28, 2018.

* cited by examiner

*Primary Examiner* — Brieann R Johnston
(74) *Attorney, Agent, or Firm* — Faegre Drinker Biddle & Reath LLP

(57) ABSTRACT

The present invention relates to thermally conductive, graphite-containing polycarbonate compositions having high flowability and mouldings for the electricals and electronics industries for heat management, in particular for complex cooling plates, heat sinks and housings in lighting technology. The compositions according to the invention are in particular also suitable for thin wall designs. The compositions contain at least one saturated or unsaturated monocarboxylic acid having a chain length of 6 to 30 carbon atoms and at least one ester of this monocarboxylic acid based on glycerol and/or diglycerol.

10 Claims, No Drawings

GRAPHITE-CONTAINING POLYCARBONATE COMPOSITIONS CONTAINING A NEW TYPE OF FLOW PROMOTER

CROSS-REFERENCE TO RELATED APPLICATIONS

This application is a national stage application (under 35 U.S.C. § 371) of PCT/EP2018/051346, filed Jan. 19, 2018, which claims benefit of European Application No. 17152566.0, filed Jan. 23, 2017, both of which are incorporated herein by reference in their entirety.

The present invention relates to thermally conductive, graphite-containing polycarbonate compositions, i.e. compositions whose predominant polymer component is polycarbonate, having high flowability. The invention further relates to mouldings made of these compositions.

Thermally conductive polycarbonate compositions are employed in particular in the electricals and electronics industries for heat management, for example for heat sinks or housings in the LED sector, for coil encasements or housings of hard disks or other mass storage devices, circuit mounts in three-dimensional MID applications or in electronics packaging for heat removal from electronic component parts.

The thermal conductivity of polycarbonate compositions may be achieved by addition of a thermally conductive filler, typically a graphite, in particular an expanded graphite. However, the addition quantity of graphite required to achieve an appreciable thermal conductivity increases the melt viscosities of the compositions to such an extent that addition of an additive for flow enhancement is necessary for processing the compositions.

The production of thin-walled housing parts or the production of component parts having longer flow paths, in particular those having a wall thickness of less than 3 mm, requires a low melt viscosity in order that during the production process of the component parts the injection mould is fully filled and that component parts may be realized with uniform wall thickness by extrusion processes. Low melt viscosities are moreover essential in the realization of one-piece component parts of relatively complex construction from one material, for example heat sinks which comprise both a massive and relatively thick pedestal and thin cooling lamellae/cooling fins. In the production of component parts by extrusion too, for example of pipes, profiles or sheets, a sufficient flowability is required since rapid cooling of the polymer melt takes place on account of the good thermal conductivity.

Conventionally used for flow enhancement and as a flame retardant is bisphenol A diphosphate (BDP), namely in amounts of up to more than 10 wt % in order to achieve the desired effect. However, this severely reduces heat resistance which is disadvantageous for the component part properties. This is illustrated by JP 201178889 A and WO 2015/135958 A1 which each describe thermoplastic compositions containing expanded graphite and a phosphorus compound. The systems described there have severely reduced heat resistances.

WO 2016/087295 A1 and WO 2016/087296 A1 describe transparent/glass fibre-containing polycarbonate compositions containing diglycerol esters as a flow enhancer. Good flow enhancement may already be achieved through diglycerol esters. However, heat resistance is in need of further improvement in such compositions too.

WO 2017/005735 A1 describes readily flowable compositions based on aromatic polycarbonate and containing graphite. Diglycerol esters are added as flow enhancers. While this allows good flowability to be achieved it is desirable to further improve heat resistance.

It is accordingly a particular object of the present invention to further improve the flowability of thermally conductive polycarbonate compositions while simultaneously achieving good heat resistances (Vicat temperatures and HDT (heat distortion temperature)) and to provide corresponding polycarbonate compositions.

It has now been found that, surprisingly, this object is achieved by the use of mixtures of monocarboxylic acids and glycerol and/or diglycerol esters thereof in thermally conductive polycarbonate compositions containing graphite. Heat resistance, determined by reference to the Vicat temperature, is maintained virtually without change upon addition of these mixtures.

The compositions according to the invention containing the carboxylic acids and glycerol and/or diglycerol esters thereof show improved rheological properties, namely an improved melt viscosity determined according to ISO 11443:2014-04 compared to corresponding compositions containing otherwise the same components except the mixture of carboxylic acids and glycerol and/or diglycerol esters thereof. These compositions preferably feature a good heat resistance measurable by reference to the Vicat temperature and the HDT.

The object is achieved by polycarbonate compositions containing
A) 50 to 95 wt %, preferably 60 to 94 wt %, more preferably 63 to 94 wt %, particularly preferably 63 to 77 wt %, of aromatic polycarbonate,
B) 3 to 40 wt %, preferably 4 to 36 wt %, more preferably 5 to 35 wt %, particularly preferably 20 to 35 wt %, very particularly preferably 25 to 35 wt %, of graphite and
C) 0.05 wt % to 5.0 wt %, preferably 0.2 to 3.0 wt %, more preferably 0.5 to 2.0 wt %, particularly preferably 0.6 to 1.8 wt %, of a mixture containing at least one saturated or unsaturated monocarboxylic acid having a chain length of 6 to 30 carbon atoms and at least one ester of this monocarboxylic acid based on glycerol and/or digycerol.

The composition may contain in addition to the components A, B and C further components, for instance heat and/or transesterification stabilizers as component D and/or further additives in the form of component E. The composition may likewise contain one or more further thermoplastics.

Further customary additives are for example demoulding agents, flame retardants, antidrip agents, antioxidants, inorganic pigments, carbon black, colorants and/or inorganic fillers such as titanium dioxide, silicates, aluminosilicates, talc, chalk, quartz, in particular in powder form, wollastonite, mica, clay, montmorillonite, aluminium oxide, magnesium oxide, silicon dioxide and/or barium sulfate, in each case alone or in mixtures.

Preferred compositions contain
A) 60 to 95 wt %, more preferably up to 94 wt %, of aromatic polycarbonate,
B) 4 to 36 wt %, more preferably 5 to 35 wt %, of graphite,
C) 0.05 wt % to 5.0 wt %, more preferably 0.6 to 1.8 wt %, of a mixture containing at least one saturated or unsaturated monocarboxylic acid having a chain length of 6 to 30 carbon atoms and at least one ester of this monocarboxylic acid based on glycerol and/or diglycerol, D) 0.0 wt % to 1.0 wt % of heat stabilizer and/or transesterification stabilizer and E) 0.0 wt % to 30.0 wt % of further additives.

Yet more preferred compositions contain

A) 62 to 95 wt %, in particular 63 to 94 wt %, of aromatic polycarbonate,

B) 4 to 36 wt %, in particular 5 to 35 wt %, of graphite,

C) 0.2 wt % to 3.0 wt %, in particular 0.6 to 1.8 wt %, of a mixture containing at least one saturated or unsaturated monocarboxylic acid having a chain length of 6 to 30 carbon atoms and at least one ester of this monocarboxylic acid based on glycerol and/or diglycerol, D) 0.005 to 0.5 wt % of heat stabilizer and/or transesterification stabilizer and E) 0.1 to 30 wt %, in particular 0.1 to 25 wt %, of further additives.

It is particularly preferable when the compositions contain

A) 63 to 77 wt %, in particular up to 754 wt %, of aromatic polycarbonate,

B) 20 to 36 wt %, in particular 25 to 35 wt %, of graphite,

C) 0.5 wt % to 2.0 wt %, in particular 0.6 to 1.8 wt %, of a mixture containing at least one saturated or unsaturated monocarboxylic acid having a chain length of 6 to 30 carbon atoms and at least one ester of this monocarboxylic acid based on glycerol and/or diglycerol, D) 0.01 to 0.2 wt % of heat stabilizer and/or transesterification stabilizer and E) 0.2 to 15 wt % of further additives.

The compositions according to the invention preferably do not contain any further components in addition to the components A to C and optionally one or more of the components D and/or E such as demoulding agents, flame retardants, antidrip agents, antioxidants, inorganic pigments, carbon black, colorants and/or inorganic fillers such as titanium dioxide, silicates, aluminosilicates, talc, chalk, quartz, in particular in powder form, wollastonite, mica, clay, montmorillonite, aluminium oxide, magnesium oxide, silicon dioxide and/or barium sulfate, i.e. the amounts of the components A, B, C and optionally D and/or E sum to 100 wt %, i.e. the composition consists of the components A, B, C and optionally D and/or E.

For applications where such high thermal conductivities are not required the graphite content may be reduced and replaced by filler.

Alternatively preferred compositions therefore contain

A) 60 to 75 wt %, more preferably 63 to 70 wt %, of aromatic polycarbonate,

B) 3 to 20 wt %, more preferably 5 to 15 wt %, of graphite,

C) 0.2 wt % to 3.0 wt %, more preferably 0.6 to 1.8 wt %, of a mixture containing at least one saturated or unsaturated monocarboxylic acid having a chain length of 6 to 30 carbon atoms and at least one ester of this monocarboxylic acid based on glycerol and/or diglycerol, D) 0.005 to 0.5 wt % of heat stabilizer and/or transesterification stabilizer and E) 12 to 35 wt % of further additives. These compositions particularly preferably contain 14 to 32 wt % of a filler. It is very particularly preferable when the component E comprises 15 to 30 wt % of talc.

All hereinabove described compositions preferably contain as component C more than 50 wt % of oleic esters of glycerol and/or diglycerol based on the total weight of the mixture C, wherein more preferably oleic acid makes up the greatest proportion of free carboxylic acids.

Present as the graphite is preferably expanded graphite, more preferably at least 70 wt %, yet more preferably at least 90 wt %, particularly preferably exclusively, expanded graphite based on the total amount of graphite in the composition.

In the context of the present invention—unless explicitly stated otherwise—the stated amounts of the components A, B, C and optionally D and/or E in wt % are in each case based on the total weight of the composition.

It is very particularly preferred when the composition contains no further components but rather the components A to C and optionally D and/or E sum to 100 wt %, i.e. the composition consists of components A, B, C and optionally D and/or E.

The compositions in which flowability is improved in the manner according to the invention are preferably used for producing mouldings. The improved flowability renders said compositions particularly suitable for the production of thin and/or complex three-dimensional component parts. "Thin" mouldings in the context of the present invention are those where wall thicknesses at the thinnest points of less than approximately 3 mm, preferably less than 3 mm, more preferably of less than 2.5 mm, yet more preferably of less than 2.0 mm, very particularly preferably of less than 1.5 mm, are present. "Approximately" is here to be understood as meaning that the actual value does not substantially deviate from the stated value, wherein a deviation of not more than 25%, preferably not more than 10%, is deemed as not substantial. The invention therefore also provides corresponding mouldings containing/consisting of these compositions. Complex three-dimensional component parts are for example heat sinks comprising both relatively thick (pedestals) and relatively thin regions (cooling fins).

The individual constituents of the compositions according to the invention are more particularly elucidated hereinbelow:

Component A

According to the invention "polycarbonate" is to be understood as meaning both homopolycarbonates and copolycarbonates, in particular aromatic ones. These polycarbonates may be linear or branched in known fashion. According to the invention mixtures of polycarbonates may also be used.

A portion, up to 80 mol %, preferably of 20 mol % to 50 mol %, of the carbonate groups in the polycarbonates used in accordance with the invention may have been replaced by aromatic dicarboxylic ester groups. Polycarbonates of this type that incorporate not only acid radicals derived from carbonic acid but also acid radicals derived from aromatic dicarboxylic acids in the molecular chain are referred to as aromatic polyester carbonates. For the purposes of the present invention, they are covered by the umbrella term "thermoplastic aromatic polycarbonates".

Replacement of the carbonate groups by the aromatic dicarboxylic ester groups proceeds essentially stoichiometrically and also quantitatively and the molar ratio of the reaction partners is therefore also reflected in the final polyester carbonate. The aromatic dicarboxylic ester groups can be incorporated either randomly or blockwise.

The thermoplastic polycarbonates including the thermoplastic aromatic polyester carbonates have average molecular weights $M_w$, determined by gel permeation chromatography to DIN 55672-1:2007-08, calibrated against bisphenol A polycarbonate standards using dichloromethane as eluent, of 10 000 g/mol to 32 000 g/mol, preferably of 12 000 g/mol to 31 000 g/mol, in particular of 15 000 g/mol to 31 000 g/mol.

The calibration was performed with linear polycarbonates (composed of bisphenol A and phosgene) of known molar mass distribution (469 g/mol to about 100 000 g/mol) from PSS Polymer Standards Service GmbH, Germany. Method 2301-0257502-09D (2009 German language version) from Currenta GmbH & Co. OHG, Leverkusen was used for the calibration. Dichloromethane was used as eluent. The column combination in the gel permeation chromatography consisted of crosslinked styrene-divinylbenzene resins. The five analytical columns had a diameter of 7.5 mm and a length of 300 mm. The particle sizes of the column material were in the range from 3 μm to 20 μm. The concentration of the analyzed solutions was 0.2 wt %. The flow rate was adjusted to 1.0 ml/min, the temperature of the solutions was 30° C. Detection was effected using a refractive index (RI) detector.

The polycarbonates present in the compositions to which the mixture of at least one carboxylic acid and glycerol and/or diglycerol esters thereof is added to improve flowability are produced in known fashion from diphenols, carbonic acid derivatives, optionally chain terminators and branching agents.

Particulars pertaining to the production of polycarbonates are disclosed in many patent documents spanning approximately the last 40 years. Reference may be made here by way of example to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouverté, BAYER AG, "Polycarbonates" in Encyclopedia of Polymer Science and Engineering, Volume 11, Second Edition, 1988, pages 648-718, and finally to U. Grigo, K. Kirchner and P. R. Wüller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299.

The production of aromatic polycarbonates is effected for example by reaction of dihydroxyaryl compounds with carbonic halides, preferably phosgene, and/or with aromatic dicarboxyl dihalides, preferably benzenedicarboxyl dihalides, by the interfacial process, optionally using chain terminators and optionally using trifunctional or more than trifunctional branching agents, production of the polyester carbonates being achieved by replacing a portion of the carbonic acid derivatives with aromatic dicarboxylic acids or derivatives of the dicarboxylic acids, specifically with aromatic dicarboxylic ester structural units according to the carbonate structural units to be replaced in the aromatic polycarbonates. Preparation via a melt polymerization process by reaction of dihydroxyaryl compounds with, for example, diphenyl carbonate is likewise possible.

Dihydroxyaryl compounds suitable for the preparation of polycarbonates are those of the formula (2)

HO—Z—OH  (2), in which
Z is an aromatic radical which has from 6 to 30 carbon atoms and may contain one or more aromatic rings, may be substituted and may contain aliphatic or cycloaliphatic radicals or alkylaryls or heteroatoms as bridging elements.

Z in formula (2) is preferably a radical of the formula (3)

(3)

in which
R$^6$ and R$^7$ each independently of one another stand for H, C$_1$- to C$_{18}$-alkyl-, C$_1$- to C$_{18}$-alkoxy, halogen such as Cl or Br or for respectively optionally substituted aryl- or aralkyl, preferably for H or C$_1$- to C$_{12}$-alkyl, particularly preferably for H or C$_1$- to C$_8$-alkyl and very particularly preferably for H or methyl, and X is a single bond, —SO$_2$—, —CO—, —O—, —S—, C$_1$- to C$_6$-alkylene, C$_2$- to C$_5$-alkylidene or C$_5$- to C$_6$-cycloalkylidene which may be substituted by C$_1$- to C$_6$-alkyl, preferably methyl or ethyl, or else is C$_6$- to C$_{12}$-arylene, optionally fused to other aromatic rings containing heteroatoms.

X preferably stands for a single bond, C$_1$- to C$_5$-alkylene, C$_2$- to C$_5$-alkylidene, C$_5$- to C$_6$-cycloalkylidene, —O—, —SO—, —CO—, —S—, —SO$_2$—or for a radical of formula (3a)

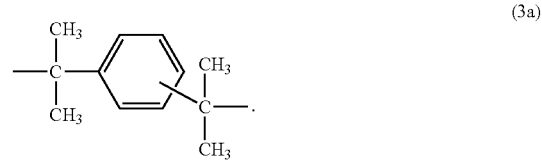

(3a)

Dihydroxyaryl compounds suitable for the production of polycarbonates are for example hydroquinone, resorcinol, dihydroxydiphenyls, bis(hydroxyphenyl)alkanes, bis(hydroxyphenyl)cycloalkanes, bis(hydroxyphenyl) sulfides, bis (hydroxyphenyl) ethers, bis(hydroxyphenyl) ketones, bis (hydroxyphenyl) sulfones, bis(hydroxyphenyl) sulfoxides, α,α'-bis(hydroxyphenyl)diisopropylbenzenes, phthalimidines derived from derivatives of isatin or phenolphthalein and the ring-alkylated, ring-arylated and ring-halogenated compounds thereof.

Preferred dihydroxyaryl compounds are 4,4'-dihydroxydiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane and also the bisphenols (I) to (III)

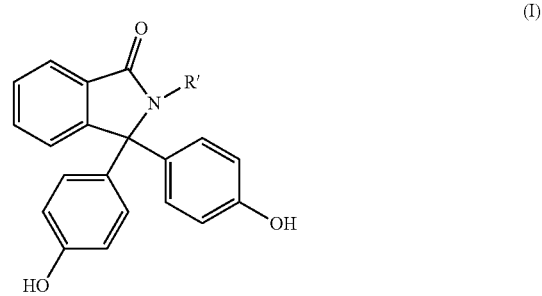

(I)

-continued

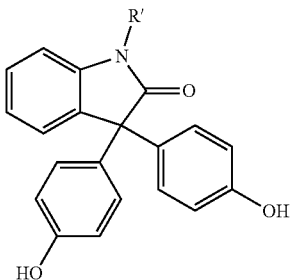
(II)

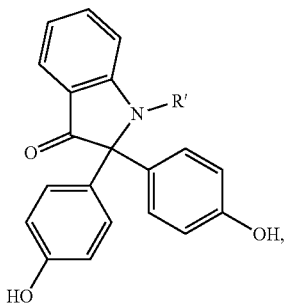
(III)

in which R' in each case stands for $C_1$- to $C_4$-alkyl, aralkyl or aryl, preferably for methyl or phenyl, very particularly preferably for methyl.

Particularly preferred dihydroxyaryl compounds are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A and also the diphenols of formulae (I), (II) and (III).

These and other suitable dihydroxyaryl compounds are described for example in U.S. Pat. Nos. 3,028,635, 2,999,825, 3,148,172, 2,991,273, 3,271,367, 4,982,014 and 2,999,846, in DE-A 1 570 703, DE-A 2063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and also in JP-A 62039/1986, JP-A 62040/1986 and JP-A 105550/1986.

In the case of homopolycarbonates only one dihydroxyaryl compound is used; in the case of copolycarbonates two or more dihydroxyaryl compounds are used. The dihydroxyaryl compounds employed, similarly to all other chemicals and assistants added to the synthesis, may be contaminated with the contaminants from their own synthesis, handling and storage. However, it is desirable to use raw materials of the highest possible purity.

Suitable carbonic acid derivatives are for example phosgene and diphenyl carbonate.

Suitable chain terminators that may be used in the production of polycarbonates are monophenols. Suitable monophenols are for example phenol itself, alkylphenols such as cresols, p-tert-butylphenol, cumylphenol and mixtures thereof.

Preferred chain terminators are the phenols mono- or polysubstituted by linear or branched $C_1$- to $C_{30}$-alkyl radicals, preferably unsubstituted or substituted by tert-butyl. Particularly preferred chain terminators are phenol, cumylphenol and/or p-tert-butylphenol.

The amount of chain terminator to be employed is preferably 0.1 to 5 mol % based on the moles of diphenols employed in each case. The addition of the chain terminators may be effected before, during or after the reaction with a carbonic acid derivative.

Suitable branching agents are the trifunctional or more than trifunctional compounds familiar in polycarbonate chemistry, in particular those having three or more than three phenolic OH groups.

Suitable branching agents are for example 1,3,5-tri(4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl)methane, tetra (4-(4-hydroxyphenylisopropyl)phenoxy)methane and 1,4-bis((4',4"-dihydroxytriphenyl)methyl)benzene and 3,3-bis (3-methyl-4-hydroxyphenyl)-2-oxo-2,3-dihydroindole.

The amount of the branching agents for optional employment is preferably 0.05 mol % to 2.00 mol %, based on moles of dihydroxyaryl compounds used in each case.

The branching agents may be either initially charged together with the dihydroxyaryl compounds and the chain terminators in the aqueous alkaline phase or added dissolved in an organic solvent before the phosgenation. In the case of the transesterification process the branching agents are employed together with the dihydroxyaryl compounds.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane and also homo- or copolycarbonates derived from the diphenols of formulae (I), (II) and (III)

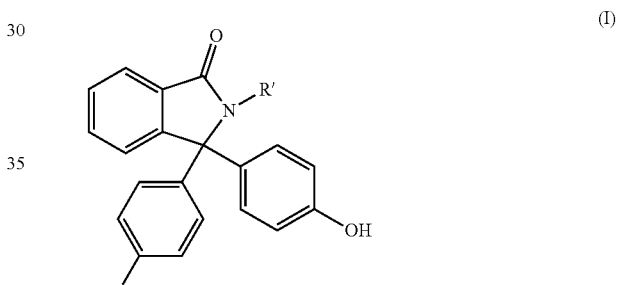
(I)

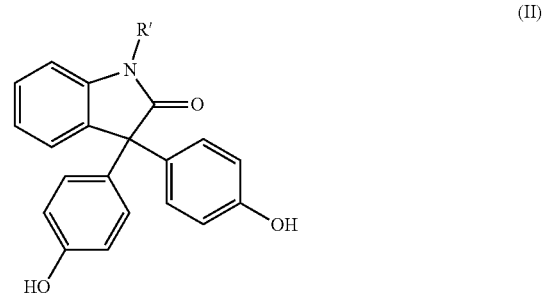
(II)

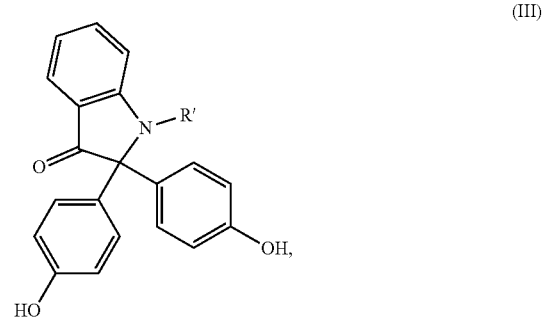
(III)

in which R' in each case stands for $C_1$- to $C_4$-alkyl, aralkyl or aryl, preferably for methyl or phenyl, very particularly preferably for methyl.

Preferred modes of production of the polycarbonates to be used according to the invention, inclusive of the polyester carbonates, are the known interfacial process and the known melt transesterification process (cf. e.g. WO 2004/063249 A1, WO 2001/05866 A1, WO 2000/105867, U.S. Pat. Nos. 5,340,905 A, 5,097,002 A, 5,717,057 A).

To achieve incorporation of additives component A is preferably employed in the form of powders, pellets or mixtures of powders and pellets.

The polycarbonate employed may also be a mixture of different polycarbonates, for example of polycarbonates A1 and A2:

It is preferable when the amount of the aromatic polycarbonate A1 based on the total amount of polycarbonate is 25.0 to 85.0 wt %, preferably 28.0 to 84.0 wt %, particularly preferably 30.0 to 83.0 wt %, wherein this aromatic polycarbonate is based on bisphenol A and preferably has a melt volume flow rate MVR of 7 to 15 cm$^3$/10 min, more preferably has a melt volume flow rate MVR of 8 to 12 cm$^3$/10 min and particularly preferably has a melt volume flow rate MVR of 8 to 11 cm$^3$/10 min determined to ISO 1133 (test temperature 300° C., mass 1.2 kg, DIN EN ISO 1133-1:2012-03).

It is preferable when the amount of the pulverulent aromatic polycarbonate A2 based on the total amount of polycarbonate is 2.0 to 12.0 wt %, preferably 3.0 to 11.0 wt %, particularly preferably 4.0 to 10.0 wt %, very particularly preferably from 5.0 to 8.0 wt %, wherein this aromatic polycarbonate is preferably based on bisphenol A and preferably has a melt volume flow rate MVR of 12 to 65 cm$^3$/10 min, more preferably has a melt volume flow rate MVR of 14 to 32 cm$^3$/10 min and particularly preferably has a melt volume flow rate MVR of 16 to 24 cm$^3$/10 min and very particularly preferably 19 cm$^3$/10 min±1 cm$^3$/10 min determined to ISO 1133 (test temperature 300° C., mass 1.2 kg, DIN EN ISO 1133-1:2012-03).

Compositions according to the invention altogether employ 50 to 95 wt %, preferably 60 to 94 wt %, more preferably 63 to 94 wt %, particularly preferably 63 to 77 wt %, of aromatic polycarbonate.

Component B

Employed as component B is graphite, preferably expanded graphite, alone or in admixture with unexpanded graphite, particularly preferably only expanded graphite.

In the expanded graphites the individual basal planes of the graphite have been driven apart by a special treatment which results in an increase in volume of the graphite, preferably by a factor of 200 to 400. The production of expanded graphites is described inter alia in the documents U.S. Pat. Nos. 1,137,373 A, 1,191,383 A and 3,404,061 A.

Graphites are used in the compositions in the form of fibres, rods, spheres, hollow spheres, platelets, in powder form, in each case either in aggregated or agglomerated form, preferably in platelet form. The platelet-shaped structure is in the present invention to be understood as meaning a particle having a flat geometry. Thus, the height of the particles is typically markedly smaller compared to the width or length of the particles. Such flat particles may in turn be agglomerated or aggregated into constructs. The height of the platelet-shaped primary particles is less than 500 nm, preferably less than 200 nm and particularly preferably less than 100 nm. As a result of the small sizes of these primary particles the shape of the particles may be bent, curved, waved or deformed in some other way. The length dimensions of the particles can be determined by standard methods, for example electron microscopy.

Graphite is employed in the compositions according to the invention in amounts of 3 to 40 wt %, preferably 4 to 36 wt %, more preferably 5 to 35 wt %, particularly preferably 20 to 35 wt %, very particularly preferably 25 to 35 wt % to obtain a good thermal conductivity of the thermoplastic compositions while simultaneously ensuring a high processing latitude. Provided that particularly high thermal conductivities are not required the graphite content may be chosen in a range from 3 to 20 wt %, preferably 5 to 15 wt %, and instead more fillers may be added.

Preferably employed in accordance with the invention is a graphite having a relatively high specific surface area determined as the BET surface area by nitrogen adsorption according to ASTM D3037. It is preferable to employ graphites having a BET surface area of >5 m$^2$/g, particularly preferably >10 m$^2$/g and very particularly preferably >18 m$^2$/g in the thermoplastic compositions.

The D(0.5) of the graphite determined by sieve analysis according to DIN 51938:2015-09 is preferably <1.2 mm. It is preferable when the graphites have a particle size distribution characterized by the D(0.9) of at least 1 mm, preferably of at least 1.2 mm, more preferably of at least 1.4 mm and yet more preferably of at least 1.5 mm. It is likewise preferable when the graphites have a particle size distribution characterized by the D(0.5) of at least 400 μm, preferably of at least 600 μm, more preferably of at least 750 μm and yet more preferably of at least 850 μm. It is preferable when the graphites have a particle size distribution characterized by the D(0.1) of at least 100 μm, preferably of at least 150 μm, more preferably of at least 200 μm and yet more preferably of at least 250 μm. The parameters D(0.1), D(0.5) and D(0.9) are determined by sieve analysis according to DIN 51938:2015-09.

The employed graphites preferably have a density determined with xylene in the range from 2.0 g/cm$^3$ to 2.4 g/cm$^3$, more preferably from 2.1 g/cm$^3$ to 2.3 g/cm$^3$ and yet more preferably from 2.2 g/cm$^3$ to 2.27 g/cm$^3$.

The carbon content of the graphites used in accordance with the invention determined to DIN 51903 at 800° C. for 20 hours is preferably >90%, more preferably >95% and yet more preferably >98%.

The residual moisture content of the graphites used in accordance with the invention determined to DIN 38414 at 110° C. for 8 hours is preferably <5%, more preferably <3% and yet more preferably <2%.

The thermal conductivity of the graphites used in accordance with the invention before processing is preferably between 250 and 400 W/(m·K) parallel to the basal planes and between 6 and 8 W/(m·K) perpendicular to the basal planes. The electrical resistance of the graphites used in accordance with the invention before processing is preferably about 0.001 Ω·cm parallel to the basal planes and less than 0.1 Ω·cm perpendicular to the basal planes.

The bulk density of the graphites determined to DIN 51705 is preferably between 50 g/l and 250 g/l, more preferably between 65 g/l and 220 g/l and yet more preferably between 100 g/l and 200 g/l.

It is preferable to employ in the thermoplastic compositions graphites having a sulfur content of less than 200 ppm. It is preferable to additionally employ in the thermoplastic compositions graphites having a leachable chlorine ion content of less than 100 ppm. It is likewise preferable to employ in the thermoplastic compositions graphites having a content of nitrates and nitrites of less than 50 ppm. It is particularly preferable to additionally employ graphites having all of these threshold values, i.e. for the sulfur, chlorine ion, nitrate and nitrite content.

Commercially available corresponding graphites are inter alia Ecophit® GFG 5, Ecophit® GFG 50, Ecophit® GFG 200, Ecophit® GFG 350, Ecophit® GFG 500, Ecophit® GFG 900, Ecophit® GFG 1200 from SGL Carbon GmbH, TIMREX® BNB90, TIMREX® KS5-44, TIMREX® KS6, TIMREX® KS150, TIMREX® SFG44, TIMREX® SFG150, TIMREX® C-THERM™ 001 and TIMREX® C-THERM™ 011 from TIMCAL Ltd., SC 20 O, SC 4000 O/SM and SC 8000 O/SM from Graphit Kropfmühl AG, Mechano-Cond 1, Mechano-Lube 2 and Mechano-Lube 4G from H.C. Carbon GmbH, Nord-Min 251 and Nord-Min 560T from Nordmann Rassmann GmbH and ASBURY A99, Asbury 230U and Asbury 3806 from Asbury Carbons.

The melt viscosities of the compositions are strongly dependent on the amount of the employed graphite. Increasing amounts also increase the melt viscosity at various shear rates, determined according to ISO 11443:2014-04 (cone and plate arrangement). The melt viscosities determined at 340° C. and a shear rate of 1000 l/s are preferably below 300 Pa·s, more preferably below 200 Pa·s.

Component C

The compositions according to the invention contain as component C a mixture containing at least one saturated or unsaturated monocarboxylic acid having a chain length of 6 to 30 carbon atoms and at least one ester of this monocarboxylic acid based on glycerol and/or diglycerol.

Isomers of diglycerol forming the basis of the monocarboxylic esters employed in accordance with the invention are the following:

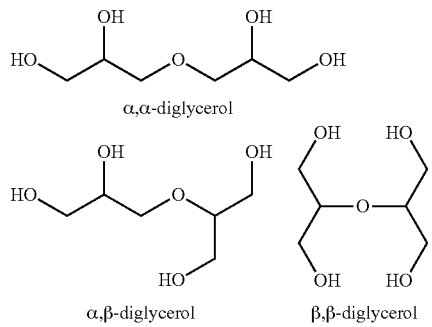

Mono- or polyesterified isomers of these formulae may be employed as the esters of diglycerol optionally employed in accordance with the invention.

Mixtures containing only one monocarboxylic acid and esters thereof or a mixture containing two or more carboxylic acids and esters thereof may be employed.

Suitable monocarboxylic acids are, for example, caprylic acid ($C_7H_{15}COOH$, octanoic acid), capric acid ($C_9H_{19}COOH$, decanoic acid), lauric acid ($C_{11}H_{23}COOH$, dodecanoic acid), myristic acid ($C_{13}H_{27}COOH$, tetradecanoic acid), palmitic acid ($C_{15}H_{31}COOH$, hexadecanoic acid), margaric acid ($C_{16}H_{33}COOH$, heptadecanoic acid), oleic acid ($C_{17}H_{33}COOH$, cis-9-octadecenoic acid), stearic acid ($C_{17}H_{35}COOH$, octadecanoic acid), arachidic acid ($C_{19}H_{39}COOH$, eicosanoic acid), behenic acid ($C_{21}H_{43}COOH$, docosanoic acid), lignoceric acid ($C_{23}H_{47}COOH$, tetracosanoic acid), palmitoleic acid ($C_{15}H_{29}COOH$, (9Z)-hexadeca-9-enoic acid), petroselic acid ($C_{17}H_{33}COOH$, (6Z)-octadeca-6-enoic acid, (9Z)-octadeca-9-enoic acid), elaidic acid ($C_{17}H_{33}COOH$, (9E)-octadeca-9-enoic acid), linoleic acid ($C_{17}H_{31}COOH$, (9Z,12Z)-octadeca-9,12-dienoic acid), alpha- and gamma-linolenic acid ($C_{17}H_{29}COOH$, (9Z,12Z,15Z)-octadeca-9,12,15-trienoic acid and (6Z,9Z,12Z)-octadeca-6,9,12-trienoic acid), arachidonic acid ($C_{19}H_{31}COOH$, (5Z,8Z,11Z,14Z)-eicosa-5,8,11,14-tetraenoic acid), timnodonic acid ($C_{19}H_{29}COOH$, (5Z,8Z,11Z,14Z,17Z)-eicosa-5,8,11,14,17-pentaenoic acid) and cervonic acid ($C_{21}H_{31}COOH$, (4Z,7Z,10Z,13Z,16Z,19Z)-docosa-4,7,10,13,16,19-hexaenoic acid).

Preference is given to saturated aliphatic monocarboxylic acids having a chain length of 8 to 30 carbon atoms, particularly preferably having 12 to 24 carbon atoms and very particularly preferably having 14 to 24 carbon atoms.

Suitable as component C are in particular mixtures obtained by partial esterification of glycerol and/or diglycerol with a carboxylic acid mixture containing two or more monocarboxylic acids having a chain length of 6 to 30 carbon atoms to afford an ester mixture. The carboxylic acid mixture preferably contains oleic acid, particularly preferably also stearic acid and/or palmitic acid.

Component C preferably contains as the ester mixture monoesters and diesters of oleic acid, of palmitic acid and/or of stearic acid with glycerol and/or diglycerol and the carboxylic acid mixture, i.e. the corresponding carboxylic acids.

Examples are glycerol monopalmitate, glycerol monooleate, diglycerol monopalmitate, diglycerol monooleate, diglycerol monostearate, diglycerol dipalmitate or diglycerol dioleate. The proportion of diesters of diglycerol is preferably smaller than the proportion of monoesters of diglycerol. Component C preferably also comprises free glycerol and/or diglycerol. However, component C may also be purified to the extent that no free glycerol and/or diglycerol remains present.

A particularly preferred mixture contains 40 to 50 wt % of diglycerol monooleate, 10 to 20 wt % of glycerol monooleate, 10 to 20 wt % of diglycerol dioleate, 1 to 3 wt % of oleic acid and up to 1.5 wt % of each of stearic acid and/or palmitic acid.

Very particularly preferred mixtures are commercially available for example from Palsgaard® under the trade name Einar® 614, previously Palsgaard® Polymers PGE 8100.

The OH numbers of these mixtures are preferably between 135 and 300 mg KOH/g, more preferably between 180 and 300 mg KOH/g (method 2011-0232602-92D, Currents GmbH & Co. OHG, Leverkusen). The acid numbers of these mixtures are preferably between 1 and 8 mg KOH/g, more preferably between 1 and 6 mg KOH/g (method 2011-0527602-14D, Currenta GmbH & Co. OHG, Leverkusen). The iodine number of the mixtures according to Wijs is preferably between 40 and 80 g iodine/100 g (method 2201-0152902-95D, Currenta GmbH & Co. OHG, Leverkusen). The content of free glycerol and polyglycerol is preferably not more than 7 wt % based on the total weight of the mixture of component C.

Particularly preferred as component C is a mixture having a content of free carboxylic acids summing to less than 3 wt % based on the total weight of the mixture C, wherein oleic acid makes up the greatest proportion.

It is very particularly preferable when the content of oleic acid in the mixture is 1.5 to 2.5 wt %, in particular approximately 2 wt %, based on the total weight of the mixture B. In this context "approximately" is to be understood as meaning a deviation of not more than 10%, preferably not more than 5%. It is very particularly preferable when oleic esters of glycerol and diglycerol form the main constituents of the ester proportions of the component C. The proportion thereof preferably sums to more than 50 wt % based on the total weight of the mixture C.

The polycarbonate-containing compositions preferably contain 0.05 to 5.0 wt %, preferably 0.5 to 3.0 wt %, more preferably 0.5 to 2.0 wt %, particularly preferably 0.6 to 1.8 wt %, of the component C.

Component D

The compositions according to the invention optionally contain one or more heat and/or transesterification stabilizers.

Preferentially suitable heat stabilizers are triphenylphosphine, tris(2,4-di-tert-butylphenyl) phosphite (Irgafos® 168), tetrakis(2,4-di-tert-butylphenyl)-[1,1-biphenyl]-4,4'-diyl bisphosphonite, octadecyl-3-(3,5-di-tert-butyl-4-hydroxyphenyl) propionate (Irganox® 1076), bis(2,4-dicumylphenyl)pentaerythritol diphosphite (Doverphos® S-9228-PC), bis(2,6-di-tert-butyl-4-methylphenyl)pentaerythritol diphosphite (ADK STAB PEP-36). Said heat stabilizers are employed alone or in admixture (for example Irganox® B900 (mixture of Irgafos® 168 and Irganox® 1076 in a 1:3 ratio) or Doverphos® S-9228-PC with Irganox® B900/Irganox® 1076).

Present as transesterification stabilizers are preferably phosphates or sulfonic esters. It is preferable when triisooctyl phosphate is present as a transesterification stabilizer.

The heat stabilizers and/or transesterification stabilizers are preferably employed in an amount up to 1.0 wt %, particularly preferably in a total amount of 0.005 to 0.5 wt %, very particularly preferably 0.01 to 0.2 wt %.

Component E

Optionally also present are further additives, preferably up to 30.0 wt %, more preferably up to 25.0 wt %, yet more preferably 0.1 to 20.0 wt %, particularly preferably 0.2 to 10.0 wt %, of further customary additives ("further additives"). Provided that the thermal conductivities may be somewhat lower it is possible to reduce the graphite content and add correspondingly more filler. In this alternative embodiment, which may be combined with the other embodiments described as preferable/particularly preferable, up to 35% of further additives may be present.

The group of further additives does not include heat stabilizers or transesterification stabilizers, since these have already been described as component D, nor the components of mixture C.

Such additives as are typically added to polycarbonate-containing compositions are flame retardants, antidrip agents, antioxidants, inorganic pigments, carbon black, colorants and/or inorganic fillers such as titanium dioxide, silicates, aluminosilicates, talc, chalk, quartz powder, wollastonite, mica/clay layers, montmorillonite, aluminium oxide, magnesium oxide, silicon dioxide and/or barium sulfate and/or demoulding agents, described for instance in EP-A 0 839 623, WO-A 96/15102, EP-A 0 500 496 or "Plastics Additives Handbook", Hans Zweifel, 5th Edition 2000, Hanser Verlag, Munich, in the amounts customary for polycarbonate. These additives may be added singly or else in admixture.

The composition is preferably free from demoulding agents, for example glycerol monostearate (GMS), since the mixture of component C itself acts as a demoulding agent.

The production of the polycarbonate compositions containing the components A to C and optionally D and/or E is effected by commonly used incorporation processes by combination, mixing and homogenization of the individual constituents, wherein in particular the homogenization preferably takes place in the melt under the influence of shear forces. Combination and mixing is optionally effected prior to melt homogenization using powder pre-mixes.

It is also possible to use premixes of pellets, or of pellets and powders, with components B to E.

It is also possible to use premixes produced from solutions of the mixture components in suitable solvents where homogenization is optionally effected in solution and the solvent is then removed.

In particular, the components B to E of the composition according to the invention may be introduced into the polycarbonate here by known processes or in the form of masterbatch.

Preference is given to the use of masterbatches to introduce components B to E, individually or in admixture.

In this connection the composition according to the invention can be combined, mixed, homogenized and subsequently extruded in customary apparatuses such as screw extruders (ZSK twin-screw extruders for example), kneaders or Brabender or Banbury mills. The extrudate can be cooled and comminuted after extrusion. It is also possible to premix individual components and then to add the remaining starting materials singly and/or likewise mixed.

The combining and commixing of a premix in the melt may also be effected in the plasticizing unit of an injection moulding machine. In this case, the melt is directly converted to a moulded article in the subsequent step.

Production of the moulded plastics parts is preferably effected by injection moulding.

The thermally conductive polycarbonate compositions to which the mixture of component C has been added for flow enhancement are suitable for the production of component parts for the electricals and electronics industries for heat management, in particular for complex cooling elements, cooling plates, heat sinks and housings in lighting technology, for example lamps or headlights, and extrudates such as pipes, sheets or profiles.

EXAMPLES

1. Description of Raw Materials and Test Methods

The polycarbonate compositions described in the following examples were produced by compounding on a Berstorff ZE 25 extruder at a throughput of 10 kg/h. The melt temperature was 275° C.

Component A-1: Linear polycarbonate based on bisphenol A having a melt volume flow rate MVR of 16.5 cm$^3$/10 min (according to DIN EN ISO 1133-1:2012-03 at a test temperature of 250° C. under a 2.16 kg load).

Component A-2: Powdered linear polycarbonate based on bisphenol A having a melt volume flow rate MVR of 19 cm$^3$/10 min (according to DIN EN ISO 1133-1:2012-03 at a test temperature of 300° C. under a 1.2 kg load).

Component B-1: SC4000 O/MS expanded graphite from AMG Mining Graphite/Graphit Kropfmühl GmbH, Hauzenberg, having a D(0.5) determined by sieve analysis according to DIN 51938:2015-09 of 1000 µm.

Component B-2: Ecophit GFG500 expanded graphite from SGL Carbon SE, Wiesbaden, having a D(0.5) determined by sieve analysis according to DIN 51938: 2015-09 of 870 µm.

Component B-3: Ecophit GFG900 expanded graphite from SGL Carbon SE, Wiesbaden, having a D(0.5) determined by sieve analysis according to 51938:2015-09 of 860 µm.

Component C: Mixture; Palsgaard® Polymers PGE 8100 from Palsgaard. This is a mixture containing the esters glycerol monooleate (about 14 wt %), diglycerol monooleate (about 45 wt %), diglycerol dioleate (about 14 wt %). The amounts of free carboxylic acids in the mixture are about 2 wt % of oleic acid and less than 1 wt % of each of stearic acid and palmitic acid. Flow promoter.

Component D: Triisooctyl phosphate (TOF) from Lanxess AG as transesterification stabilizer.

Component E: Finntalc MO5SLC from Mondo Minerals B.V., compacted laminar talc.

Component F: Poem DL-100 (diglycerol monolaurate) from Riken Vitamin as flow promoter.

The melt volume flow rate (MVR) was determined according to DIN EN ISO 1133-1:2012-03 (at a test temperature of 300° C., mass 1.2 kg) using a Zwick 4106 instrument from Zwick Roell.

The melt viscosities were determined as per ISO 11443:2014-04 with a Göttfert Visco-Robo 45.00 instrument (cone/plate arrangement).

As a measure of heat resistance the Vicat softening temperature VST/B50/B120 was determined according to DIN ISO 306:2014-3 on 8 mm×10 mm×4 mm test specimens with a needle load of 50 N and a heating rate of 50° C./h or 120° C./h using a Coesfeld Eco 2920 instrument from Coesfeld Materialtest.

The Charpy impact strength was measured at room temperature according to DIN EN ISO 7391-2:2006 on single-side-injected test bars measuring 80 mm×10 mm×3 mm.

The tensile modulus of elasticity was measured according to DIN EN 527-1/-2:1996-04 on single-side-injected dumb-bells having a core measuring 80 mm×10 mm×4 mm.

The tensile strength, breaking stress and breaking elongation were determined by tensile test according to DIN EN ISO 527-1/-2:1996-04.

The flammability of the specimens was assessed and classified according to UL 94. To this end test specimens measuring 125 mm×13 mm×d (mm) were produced, wherein the thickness d is the smallest wall thickness in the intended application. A V0 classification means that the flame self-extinguishes after not more than 10 seconds. There are no burning drips. Afterglow after second flaming has a duration of not more than 30 s.

The thermal conductivity in the injection moulding direction (in-plane) at 23° C. was determined according to ASTM E 1461:2013 on specimens measuring 80 mm×80 mm×2 mm.

The thermal conductivity in the injection moulding direction (through-plane) at 23° C. was determined according to ASTM E 1461:2013 on specimens measuring 80 mm×80 mm×2 mm.

The heat deflection temperature (HDT) as a measure of heat resistance was measured according to DIN EN ISO 75-1:2013-08 on test specimens measuring 80 mm×10 mm×4 mm with a loading of 1.8 MPa (HDT A) or 0.45 MPa (HDT B) with a HDT Vollautomat instrument from Coesfeld.

2. Formulations and Results

TABLE 1

Inventive compositions 2 to 4 and comparative example 1

|  |  | V1 | 2 | 3 | 4 |
|---|---|---|---|---|---|
| Formulation |  |  |  |  |  |
| A-1 | wt % | 68.00 | 68.00 | 68.00 | 68.00 |
| A-2 | wt % | 6.99 | 6.39 | 6.19 | 5.79 |
| B-1 | wt % | 25.00 | 25.00 | 25.00 | 25.00 |

TABLE 1-continued

Inventive compositions 2 to 4 and comparative example 1

|  |  | V1 | 2 | 3 | 4 |
|---|---|---|---|---|---|
| C | wt % | — | 0.60 | 0.80 | 1.20 |
| D | wt % | 0.01 | 0.01 | 0.01 | 0.01 |
| Tests: |  |  |  |  |  |
| Melt viscosity at 320° C. |  |  |  |  |  |
| eta 50 | Pa · s | 590 | 646 | 491 | 365 |
| eta 100 | Pa · s | 438 | 372 | 372 | 282 |
| eta 200 | Pa · s | 319 | 242 | 245 | 218 |
| eta 500 | Pa · s | 210 | 158 | 151 | 143 |
| eta 1000 | Pa · s | 157 | 123 | 118 | 107 |
| eta 1500 | Pa · s | 135 | 110 | 103 | 96 |
| eta 5000 | Pa · s | 82 | 67 | 50 | 63 |
| Melt viscosity at 340° C. |  |  |  |  |  |
| eta 50 | Pa · s | 428 | 477 | 288 | 234 |
| eta 100 | Pa · s | 300 | 214 | 200 | 175 |
| eta 200 | Pa · s | 215 | 135 | 132 | 132 |
| eta 500 | Pa · s | 135 | 89 | 90 | 89 |
| eta 1000 | Pa · s | 102 | 66 | 71 | 61 |
| eta 1500 | Pa · s | 83 | 60 | 55 | 55 |
| eta 5000 | Pa · s | 50 | 40 | 29 | 31 |

TABLE 2

Inventive compositions 6 to 8 and comparative example 5

|  |  | V5 | 6 | 7 | 8 |
|---|---|---|---|---|---|
| Formulation |  |  |  |  |  |
| A-1 | wt % | 68.00 | 68.00 | 68.00 | 68.00 |
| A-2 | wt % | 6.99 | 6.39 | 5.99 | 5.79 |
| B-2 | wt % | 25.00 | 25.00 | 25.00 | 25.00 |
| C | wt % | — | 0.60 | 1.00 | 1.20 |
| D | wt % | 0.01 | 0.01 | 0.01 | 0.01 |
| Tests: |  |  |  |  |  |
| Melt viscosity at 320° C. |  |  |  |  |  |
| eta 50 | Pa · s | 500 | 477 | 379 | 323 |
| eta 100 | Pa · s | 393 | 358 | 302 | 257 |
| eta 200 | Pa · s | 305 | 256 | 229 | 204 |
| eta 500 | Pa · s | 209 | 178 | 160 | 154 |
| eta 1000 | Pa · s | 161 | 129 | 127 | 124 |
| eta 1500 | Pa · s | 138 | 112 | 110 | 108 |
| eta 5000 | Pa · s | 82 | 69 | 68 | 67 |
| Melt viscosity at 340° C. |  |  |  |  |  |
| eta 50 | Pa · s | 358 | 253 | 229 | 234 |
| eta 100 | Pa · s | 275 | 197 | 182 | 182 |
| eta 200 | Pa · s | 215 | 151 | 140 | 138 |
| eta 500 | Pa · s | 151 | 111 | 98 | 100 |
| eta 1000 | Pa · s | 117 | 87 | 79 | 77 |
| eta 1500 | Pa · s | 101 | 76 | 70 | 68 |
| eta 5000 | Pa · s | 63 | 49 | 47 | 45 |
| Melt viscosity at 360° C. |  |  |  |  |  |
| eta 50 | Pa · s | 281 | 168 | 126 | 85 |
| eta 100 | Pa · s | 220 | 126 | 105 | 72 |
| eta 200 | Pa · s | 169 | 95 | 84 | 63 |
| eta 500 | Pa · s | 114 | 68 | 60 | 49 |
| eta 1000 | Pa · s | 86 | 51 | 48 | 41 |
| eta 1500 | Pa · s | 73 |  | 44 | 38 |
| eta 5000 | Pa · s | 48 |  | 30 | 27 |

TABLE 3

| | | Inventive compositions 9 to 13 | | | | |
|---|---|---|---|---|---|---|
| | | 9 | 10 | 11 | 12 | 13 |
| Formulation | | | | | | |
| A-1 | % by wt. | 68.00 | 68.00 | 68.00 | 68.00 | 58.00 |
| A-2 | % by wt. | 6.19 | 5.69 | 5.19 | 5.19 | 5.19 |
| B-1 | % by wt. | 25.00 | 25.00 | 25.00 | | |
| B-2 | % by wt. | | | | 25.00 | 35.00 |
| C | % by wt. | 0.80 | 1.30 | 1.80 | 1.8 | 1.8 |
| D | % by wt. | 0.01 | 0.01 | 0.01 | 0.01 | 0.01 |
| Tests: | | | | | | |
| Ash content 525° C./2 h | | 24.17 | 23.87 | 24.05 | 26.4 | 35.95 |
| Melt viscosity at 300° C. | | | | | | |
| eta 50 | Pa · s | 772 | 618 | 519 | 379 | 562 |
| eta 100 | Pa · s | 583 | 501 | 398 | 274 | 407 |
| eta 200 | Pa · s | 439 | 377 | 326 | 200 | 324 |
| eta 500 | Pa · s | 295 | 259 | 224 | 139 | 224 |
| eta 1000 | Pa · s | 222 | 189 | 174 | 107 | 174 |
| eta 1500 | Pa · s | 190 | 160 | 146 | 91 | 146 |
| eta 5000 | Pa · s | 104 | 91 | 84 | 60 | 89 |
| Melt viscosity at 330° C. | | | | | | |
| eta 50 | Pa · s | 392 | 288 | 269 | 239 | 253 |
| eta 100 | Pa · s | 295 | 224 | 204 | 175 | 197 |
| eta 200 | Pa · s | 211 | 174 | 154 | 123 | 140 |
| eta 500 | Pa · s | 147 | 119 | 105 | 83 | 94 |
| eta 1000 | Pa · s | 108 | 89 | 76 | 64 | 72 |
| eta 1500 | Pa · s | 89 | 76 | 66 | 56 | 62 |
| eta 5000 | Pa · s | 58 | 49 | 42 | 39 | 44 |
| Thermal tests | | | | | | |
| Vicat VST B50 | ° C. | 138.6 | 133.7 | 134.1 | 133.0 | 134.1 |
| Vicat VST B120 | ° C. | 140.0 | 135.0 | 132.3 | 134.6 | 134.9 |
| HDT A | ° C. | 132.5 | 128.0 | 127.1 | 127.9 | 129.2 |
| HDT B | ° C. | 138.0 | 133.5 | 132.3 | 133.2 | 135.1 |
| Tensile test | | | | | | |
| Tensile modulus | N/mm$^2$ | 5181 | 5192 | 5585 | 5342 | 6610 |
| Tensile strength | N/mm$^2$ | 39.0 | 38.0 | 39.0 | 37.0 | 36.0 |
| Breaking stress | N/mm$^2$ | 39.0 | 38.0 | 39.0 | 37.0 | 36.0 |
| Breaking elongation | % | 1.1 | 1.0 | 1.0 | 1.0 | 0.7 |
| Charpy impact strength ISO7391/179eU 4 mm | kJ/m$^2$ | 7 s | 6 s | 6s | 6 s | 4 s |
| UL94V in 2.0 mm | | | | | | |
| (48 h, 23° C.) | | f | f | f | V0 | V0 |
| Individual assessment V0/V1/V2/Vf | | 1/2/—/2 | 1/1/—/3 | —/—/—/5 | 5/—/—/— | 5/—/—/— |
| Afterflame time | s | >113 | >127 | >180 | 10 | 10 |
| Afterflame time (1st application of flame) | s | — | — | — | — | — |
| (7 d, 70° C.) | | f | V1 | f | V0 | V0 |
| Individual assessment V0/V1/V2/Vf | | 1/2/—/2 | 2/3/—/— | 3/—/—/2 | 5/—/—/— | 5/—/—/— |
| Afterflame time | s | >109 | 45 | >94 | 13 | 10 |
| Afterflame time (1st application of flame) | s | — | >45 | 51 | — | — |
| Overall assessment | | f | f | f | V0 | V0 |
| Thermal linear expansion coefficient | | | | | | |
| transverse | ppm · K$^{-1}$ | 44.59 | 44.28 | 44.26 | 44.91 | 36.2 |
| longitudinal | ppm · K$^{-1}$ | 32.38 | 32.13 | 28.6 | 31.56 | 19.47 |
| Thermal conductivity perpendicular to injection direction (through plane) | | | | | | |
| Thickness | mm | 1.985 | 1.985 | 1.989 | 1.986 | 1.983 |
| Temperature conductivity | mm$^2$/s | 0.641 | 0.697 | 0.642 | 0.626 | 1.016 |
| Thermal conductivity | W/(m · K) | 1.04 | 1.1 | 1 | 0.98 | 1.58 |
| Density | g/cm$^3$ | 1.34 | 1.33 | 1.37 | 1.34 | 1.42 |
| Cp | J/(g · K) | 1.172 | 1.186 | 1.14 | 1.165 | 1.098 |

TABLE 3-continued

| | | \multicolumn{5}{c}{Inventive compositions 9 to 13} |
|---|---|---|---|---|---|---|
| | | 9 | 10 | 11 | 12 | 13 |
| Thermal conductivity in injection direction (in plane) | | | | | | |
| Thickness | mm | 2.067 | 2.046 | 2.056 | 2.019 | 1.979 |
| Temperature conductivity | mm$^2$/s | 6.153 | 6.28 | 6.314 | 7.01 | 8.043 |
| Thermal conductivity | W/(m · K) | 9.65 | 9.91 | 9.5 | 10.94 | 12.53 | f: fail

The comparative examples V1 and V5 which do not contain the mixture C have a markedly lower flowability at various temperatures over the entire shear range, shown by the melt viscosities, than the inventive examples.

TABLE 4

| | | \multicolumn{12}{c}{Inventive compositions 14 to 25} |
|---|---|---|---|---|---|---|---|---|---|---|---|---|---|
| | | 14 | 15 | 16 | 17 | 18 | 19 | 20 | 21 | 22 | 23 | 24 | 25 |
| Formulation | | | | | | | | | | | | | |
| A-1 | wt % | 75.00 | 75.00 | 45.00 | 45.00 | 75.00 | 75.00 | 55.00 | 55.00 | 22.00 | 75.00 | 60.00 | 60.00 |
| A-2 | wt % | 18.80 | 18.50 | 18.80 | 18.50 | 13.80 | 13.50 | 13.80 | 13.50 | 8.80 | 8.50 | 8.80 | 8.50 |
| B-3 | wt % | 5.00 | 5.00 | 5.00 | 5.00 | 10.00 | 10.00 | 10.00 | 10.00 | 15.00 | 15.00 | 15.00 | 15.00 |
| C | wt % | 1.20 | 1.50 | 1.20 | 1.50 | 1.20 | 1.50 | 1.20 | 1.50 | 1.20 | 1.50 | 1.20 | 1.50 |
| E | wt % | | | 30.00 | 30.00 | | | 20.00 | 20.00 | | | 15.00 | 15.00 |
| Tests: Melt viscosity at 300° C. | | | | | | | | | | | | | |
| eta 50 | Pa · s | | | | | | | | | | | | |
| eta 100 | Pa · s | | | | | | | | | | | | |
| eta 200 | Pa · s | | | | | | | | | | 376 | | 418 |
| eta 500 | Pa · s | 199 | 152 | | | 241 | 192 | 157 | | 263 | 160 | 206 | 293 |
| eta 1000 | Pa · s | 168 | 137 | | | 196 | 160 | 124 | 99 | 207 | 129 | 179 | 221 |
| eta 1500 | Pa · s | 150 | 125 | 57 | 59 | 171 | 142 | 109 | 90 | 176 | 112 | 157 | 187 |
| eta 5000 | Pa · s | 88 | 81 | 40 | 39 | 99 | 87 | 67 | 62 | 102 | 70 | 91 | 108 |
| Melt viscosity at 330° C. | | | | | | | | | | | | | |
| eta 50 | Pa · s | | | | | | | | | | | | |
| eta 100 | Pa · s | | | | | | | | | | | | |
| eta 200 | Pa · s | | | | | | | | | | | | |
| eta 500 | Pa · s | | | | — | | | | | | | | |
| eta 1000 | Pa · s | 83 | | | | 75 | | | | | | | |
| eta 1500 | Pa · s | 75 | 60 | | | 71 | 48 | | | 51 | | 61 | 54 |
| eta 5000 | Pa · s | 52 | 45 | | | 53 | 38 | | | 35 | | 37 | 38 |
| Thermal tests | | | | | | | | | | | | | |
| Vicat VST B50 | ° C. | 136.5 | 134.6 | 128.9 | 126.5 | 135.8 | 133.1 | 132.6 | 130.4 | 134.4 | 131.8 | 135.8 | 133.4 |
| Vicat VST B120 | ° C. | 137.7 | 136.1 | 130.6 | 128.1 | 137.1 | 134.8 | 134.2 | 132.0 | 136.4 | 133.9 | 137.3 | 134.9 |
| HDT A | ° C. | 118.4 | 116.8 | 120.2 | 117.3 | 120.7 | 117.8 | 123.4 | 121.0 | 123.6 | 120.8 | 127.9 | 125.5 |
| HDT B | ° C. | 131.9 | 129.8 | 127.1 | 124.0 | 132.5 | 130.1 | 130.9 | 128.4 | 132.7 | 130.3 | 134.5 | 132.2 |
| Thermal conductivity (in plane) | W/(m*K) | 0.62 | 0.65 | 2.77 | 2.78 | 1.8 | 1.89 | 3.7 | 4.34 | 4.42 | 4.22 | 6.19 | 6.98 |
| Thermal linear expansion coefficient | | | | | | | | | | | | | |
| transverse | ppm*K$^{-1}$ | 63.61 | 64.28 | 45.91 | 42.37 | 58.75 | 58.79 | 46.66 | 45.39 | 54.34 | 53.06 | 46.48 | 46.46 |
| longitudinal | ppm*K$^{-1}$ | 62.87 | 58.89 | 28.35 | 30.93 | 54.28 | 46.92 | 31.73 | 32.62 | 42.17 | 39.07 | 27.60 | 32.68 |

In the mixtures comprising the components A, B and C the addition of component E in each case results in an increase in the thermal conductivity and also in a reduction of the thermal linear expansion coefficient.

TABLE 5

Inventive compositions 26 and 27 and comparative examples 6 and 7

|  |  | 26 | 27 | V6 | V7 |
|---|---|---|---|---|---|
| Formulation |  |  |  |  |  |
| A-1 | % by wt. | 68.00 | 58.00 | 68.00 | 58.00 |
| A-2 | % by wt. | 5.19 | 5.19 | 5.19 | 5.19 |
| B-3 | % by wt. | 25.00 | 35.00 | 25.00 | 35.00 |
| C | % by wt. | 1.80 | 1.80 |  |  |
| D | % by wt. | 0.01 | 0.01 | 0.01 | 0.01 |
| F | % by wt. |  |  | 1.80 | 1.80 |
| Tests: |  |  |  |  |  |
| Melt viscosity at 330° C. |  |  |  |  |  |
| eta 50 | Pa · s | 239 | 253 | 182 | 229 |
| eta 100 | Pa · s | 175 | 197 | 132 | 161 |
| eta 200 | Pa · s | 123 | 140 | 95 | 115 |
| eta 500 | Pa · s | 83 | 94 | 68 | 78 |
| eta 1000 | Pa · s | 64 | 72 | 49 | 58 |
| eta 1500 | Pa · s | 56 | 62 | 41 | 49 |
| eta 5000 | Pa · s | 39 | 44 | 26 | 33 |
| Thermal tests |  |  |  |  |  |
| Vicat VST B50 | ° C. | 133.0 | 134.1 | 127.0 | 127.8 |
| Vicat VST B120 | ° C. | 134.6 | 134.9 | 128.7 | 129.6 |
| HDT A | ° C. | 127.9 | 129.2 | 120.1 | 120.7 |
| HDT B | ° C. | 133.2 | 135.1 | 127.8 | 127.4 |

As is apparent, compared to the component C employed according to the invention a diglycerol ester without free acid is disadvantageous. Compared to the readily flowable compositions containing only diglycerol ester without acid, the inventive compositions show comparable rheological properties coupled with markedly higher Vicat temperatures and HDT.

The invention claimed is:

1. A composition comprising
   A) 50 to 95 wt % of aromatic polycarbonate,
   B) 25 to 35 wt % of graphite and
   C) 0.6 wt % to 1.8 wt % of a mixture containing 40 to 50 wt % of diglycerol monooleate, 10 to 20 wt % of glycerol monooleate, 10 to 20 wt % of diglycerol dioleate, 1 to 3 wt % of oleic acid and up to 1.5 wt % of stearic acid and up to 1.5 wt % of palmitic acid.

2. The composition according to claim 1 comprising
   A) 62 to 95 wt % of aromatic polycarbonate,
   D) 0.005 to 0.5 wt % of heat stabilizer and/or transesterification stabilizer and
   E) 0.1 to 30 wt % of further additives.

3. The composition according to claim 1, consisting of
   A) 63 to 77 wt % of aromatic polycarbonate,
   25 to 35 wt % of graphite,
   C) 0.6 wt % to 1.8 wt % of a mixture containing 40 to 50 wt % of diglycerol monooleate, 10 to 20 wt % of glycerol monooleate, 10 to 20 wt % of diglycerol dioleate, 1 to 3 wt % of oleic acid and up to 1.5 wt % of stearic acid and up to 1.5 wt % of palmitic acid
   D) 0.01 to 0.2 wt % of heat stabilizer and/or transesterification stabilizer and
   E) 0.2 to 15 wt % of further additives.

4. The composition according to claim 1, wherein the graphite of component B is expanded graphite.

5. A moulding made of a composition according to claim 1.

6. The moulding according to claim 5, having a wall thickness of less than 3 mm.

7. The moulding according to claim 6, having a wall thickness of less than 1.5 mm.

8. The moulding according to claim 5, wherein the moulding is a heat sink, a housing or an extrudate.

9. A composition comprising
   A) 50 to 95 wt % of aromatic polycarbonate,
   B) 5 to 40 wt % of graphite and
   C) 0.6 wt % to 1.8 wt % of a mixture containing 40 to 50 wt % of diglycerol monooleate, 10 to 20 wt % of glycerol monooleate, 10 to 20 wt % of diglycerol dioleate, 1 to 3 wt % of oleic acid and up to 1.5 wt % of stearic acid and up to 1.5 wt % of palmitic acid.

10. A composition comprising
    A) 50 to 95 wt % of aromatic polycarbonate,
    B) 20 to 40 wt % of graphite and
    C) 0.6 wt % to 1.8 wt % of a mixture containing 40 to 50 wt % of diglycerol monooleate, 10 to 20 wt % of glycerol monooleate, 10 to 20 wt % of diglycerol dioleate, 1 to 3 wt % of oleic acid and up to 1.5 wt % of stearic acid and up to 1.5 wt % of palmitic acid.

* * * * *